(12) United States Patent
Bergau et al.

(10) Patent No.: US 12,480,759 B2
(45) Date of Patent: Nov. 25, 2025

(54) STEREOSCOPIC MEASURING DEVICE FOR DETERMINING POSITION INFORMATION OF AN EVENT LOCATION IN AN INTERSTITIAL SPACE FROM A REFERENCE POINT AND METHOD FOR DETERMINING POSITION INFORMATION OF AN EVENT LOCATION IN AN INTERSTITIAL SPACE

(71) Applicant: Endress+Hauser Group Services AG, Reinach (CH)

(72) Inventors: Max Bergau, Freiburg (DE); Tobias Meinert, Freiburg (DE); Benjamin Scherer, Oberried (DE)

(73) Assignee: Endress+Hauser Group Services AG, Reinach (CH)

( * ) Notice: Subject to any disclaimer, the term of this patent is extended or adjusted under 35 U.S.C. 154(b) by 427 days.

(21) Appl. No.: 18/145,135

(22) Filed: Dec. 22, 2022

(65) Prior Publication Data

US 2023/0204347 A1     Jun. 29, 2023

(30) Foreign Application Priority Data

Dec. 23, 2021   (DE) .................. 10 2021 134 446.8

(51) Int. Cl.
*G01B 11/25*   (2006.01)
(52) U.S. Cl.
CPC .................................. *G01B 11/25* (2013.01)
(58) Field of Classification Search
CPC .................. G01B 11/25; G01B 11/002

USPC ................. 382/106, 154; 348/135, 47
See application file for complete search history.

(56) References Cited

U.S. PATENT DOCUMENTS

| | | | |
|---|---|---|---|
| 2013/0100250 A1* | 4/2013 | Raskar | G01S 7/4808 348/46 |
| 2014/0009611 A1* | 1/2014 | Hiebl | G03B 15/006 348/143 |
| 2014/0285631 A1* | 9/2014 | Janky | G01C 21/206 348/47 |
| 2018/0284015 A1* | 10/2018 | Imade | G01N 21/27 |
| 2019/0145891 A1* | 5/2019 | Waxman | G01N 21/3504 356/409 |
| 2019/0154439 A1* | 5/2019 | Binder | G01S 15/42 |

(Continued)

*Primary Examiner* — Kathleen Y Dulaney
(74) *Attorney, Agent, or Firm* — Kelly J. Smith; Endress+Hauser (USA) Holding, Inc.

(57) ABSTRACT

A stereoscopic measuring device for determining position information of an event location comprises a background surface and a lighting assembly having a first lighting position and a second lighting position for the illumination of the background surface at different angles. The light beams from the lighting positions passing through an event location are projected at spaced-apart projection locations at a projection location distance. The measuring device also includes an imaging apparatus for imaging the projection locations and an evaluation apparatus for detecting an event, for determining the projection location distance and the position information of the event location based on the projection location distance. The event location is a location at which the medium to be detected appears. Its interaction with the light beams changes a property of the projection locations compared to reference conditions in which the medium to be detected is absent or effective in a different way.

13 Claims, 1 Drawing Sheet

(56) References Cited

U.S. PATENT DOCUMENTS

2020/0011993 A1* 1/2020 Thiemt ................ G01S 7/4813
2023/0088410 A1* 3/2023 Jongsma .............. G01C 15/002
                                                                            348/135

* cited by examiner

STEREOSCOPIC MEASURING DEVICE FOR DETERMINING POSITION INFORMATION OF AN EVENT LOCATION IN AN INTERSTITIAL SPACE FROM A REFERENCE POINT AND METHOD FOR DETERMINING POSITION INFORMATION OF AN EVENT LOCATION IN AN INTERSTITIAL SPACE

CROSS-REFERENCE TO RELATED APPLICATION

The present application is related to and claims the priority benefit of German Patent Application No. 10 2021 134 446.8, filed on Dec. 23, 2021, the entire contents of which are incorporated herein by reference.

TECHNICAL FIELD

The present disclosure relates to a stereoscopic measuring device for determining position information of an event location in an interstitial space from a reference point and to a method for determining position information of an event location in an interstitial space.

BACKGROUND

Event locations within the meaning of the present disclosure are locations at which a medium, such as a gas or a vapor, is to be detected, the presence of which in the interstitial space is to be monitored. Stereophotographic approaches are known by which location and speed information is obtained on the basis of recordings of a gas cloud using two spaced-apart cameras. Such approaches are described, for example, by Rangel et al. in "On Scene Flow Computation of Gas Structures with Optical Imaging Cameras", WACV 2020, page 174 and in "Catadiotropic Stereo Optical Gas Imaging System for Scene Flow Computation of Gas Structures", IEEE Sensos Journal, col. 21, no. 5 Mar. 1, 2021, page 6811. However, these systems are very expensive since they require two infrared cameras.

SUMMARY

It is therefore the object of the present disclosure to provide a simpler measuring device and a simpler method.

This object is achieved according to the present disclosure by the measuring device according to disclosure.

The stereoscopic measuring device according to the present disclosure for determining position information of at least one event location in an interstitial space includes: a lighting assembly; a background structure which has a background surface facing the lighting assembly; an imaging apparatus; and an evaluation apparatus; wherein the interstitial space is disposed between the background surface and the lighting assembly; wherein the lighting assembly is configured to illuminate the background surface across the interstitial space from a first lighting position and from at least a second lighting position, wherein the first lighting position has a defined lighting distance from the second lighting position, wherein first light beams originating from the first lighting position and passing through an event location in the interstitial space, together with second light beams passing through the event location in the interstitial space and originating from the second lighting position, form an angle of not less than 1°, for example, not less than 2°, such that a first projection location of the event location on the background surface generated by the illumination of the background surface from the first lighting position has a projection location distance from a second projection location of the event location generated by the illumination of the background surface from the second lighting position, wherein the imaging apparatus is configured to image the first projection location and the second projection location in a spatially resolved manner, wherein the evaluation apparatus is configured to detect an event, to determine the projection location distance, and to determine the position information of the event location on the basis of the projection location distance, wherein the event location is a location at which an event occurs which comprises the appearance of the medium to be detected, wherein, in the presence of the medium to be detected, an interaction of the medium to be detected with the first and second light beams changes at least one property of the first projection location and a property of the second projection location in relation to reference conditions in which the medium to be detected is absent or effective in a different way.

In a development of the present disclosure the evaluation apparatus is configured to detect the presence of the medium to be detected on the basis of the changed property of the first projection location and the changed property of the second projection location.

In a development of the present disclosure the first and second light beams differ in at least one property selected from the list of the following properties: wavelength, modulation, lighting time.

In a development of the present disclosure the changed property of the first and/or second projection locations includes intensity and/or intensity fluctuations.

In a development of the present disclosure, the evaluation apparatus is configured to calculate the position information as a function of the projection location distance and the distance between the lighting assembly and the background surface. In this case, data relating to the background surface such as the distance and material of the background surface can be included, which are measured in parallel, for example when imaging the background surface, for example by means of LIDAR.

In a development of the present disclosure the imaging apparatus comprises a camera which is sensitive in the spectral range of the first and second light beams, such as, an IR camera.

In a development of the present disclosure the lighting assembly comprises at least one laser, such as an interband cascade laser.

In a development of the present disclosure the lighting assembly comprises at least one optical beam expander with at least one refractive, diffractive and/or reflective element, so that with the first and second light beams the light of the at least one laser illuminates a solid angle of not less than 0.024 sr, in, for example not less than 0.04 sr, and/or in the horizontal with a half-angle of not less than 5° or not less than 10°. Alternatively, the lighting assembly can have a scanner apparatus which is configured to illuminate from the two lighting positions the background surface in scanning fashion with the light of the laser. In this case, the scanner apparatus can have a plurality of scanners, such as two scanners, each of which is arranged at an lighting position. With the use of a scanning apparatus, the illumination can be performed with collimated laser light. Each scanner can be assigned its own laser. Likewise, the illumination can be performed from several lighting positions with only one laser and one scanner.

In a development of the present disclosure the distance of the background surface from the lighting assembly is not less than 0.5 m, for example not less than 2.5 m, and, for example, not less than 10 m.

In a development of the present disclosure the distance between the imaging apparatus and the background surface differs from the distance of the lighting assembly from the background surface by not more than 20%, such as not more than 10% of the distance of the lighting assembly from the background surface.

In a development of the present disclosure, imaging apparatus is arranged in a space which is delimited by two parallel planes, the normal vector of which runs between the first and the second lighting position.

The method according to the present disclosure for stereoscopic determination of position information of at least one event location in an interstitial space by means of a stereoscopic measuring device according to the present disclosure comprises: illuminating a background surface across an interstitial space from a first lighting position; imaging, in a spatially resolved manner, the background surface during illumination of the background surface from the first lighting position; illuminating a background surface across an interstitial space from a second lighting position; imaging, in a spatially resolved manner, the background surface during illumination of the background surface from the second lighting position; wherein first light beams originating from the first lighting position and passing through an event location in the interstitial space, together with second light beams passing through the event location in the interstitial space and originating from the second lighting position, form an angle of not less than 1°, for example, not less than 2°, such that a first projection location of the event location on the background surface generated by the illumination of the background surface from the first lighting position has a projection location distance from a second projection location of the event location generated by the illumination of the background surface from the second lighting position; detecting an event; determining the projection location distance; and determining the position information of the event location on the basis of the projection location distance, wherein the event location is a location at which the event occurs which comprises the appearance of the medium to be detected, wherein, in the presence of the medium to be detected, an interaction of the medium to be detected with the first and second light beams changes at least one property of the first projection location and a property of the second projection location in relation to reference conditions in which the medium to be detected is absent or effective in a different way.

In a development of the present disclosure the detection of an event comprises the comparison of imagings of the background surface at different illuminations, wherein an event is detected when projection locations are to be detected that have different brightnesses in comparison with imagings.

In a development of the present disclosure, the illumination from the first lighting position comprises a first measurement illumination with a measurement wavelength and a first reference illumination with a reference wavelength, wherein the illumination from the second lighting position comprises a second measurement illumination with the measurement wavelength and a second reference illumination with the reference wavelength, wherein the medium has different absorption coefficients at the measurement wavelength and the reference wavelength, wherein the background surface is imaged for the illuminations from the first and second lighting positions with the measurement wavelength and the reference wavelength, wherein the comparison is made between an imaging during the illumination with the reference wavelength and the reference wavelength. The switching of the illumination between the measurement wavelength and the reference wavelength can be achieved on the one hand by discrete switching between the two wavelengths, and on the other hand by a continuous or harmonic modulation of the wavelength with a corresponding data acquisition in the lock-in method.

In a development of the present disclosure reference conditions are conditions in which the medium has not yet appeared, wherein the illumination from the lighting position is carried out with a measurement wavelength at which the medium has a greater absorption coefficient than the atmosphere under reference conditions, wherein the comparison is performed between recordings created at different times from the same lighting position.

In a development of the present disclosure, the medium to be detected comprises a gas, or a gas mixture, which differs in chemical or physical properties from the reference atmosphere, for example air at temperatures between −20° and 40°. The gas can comprise, for example, volatile hydrocarbons such as $CH_4$ or $NO_2$, $N_2O$, $NO$, ammonia, carbon dioxide or hydrogen sulfide.

BRIEF DESCRIPTION OF THE DRAWINGS

The present disclosure is now explained in greater detail on the basis of the exemplary embodiments shown in the drawings, in which.

DETAILED DESCRIPTION

Figure 1:
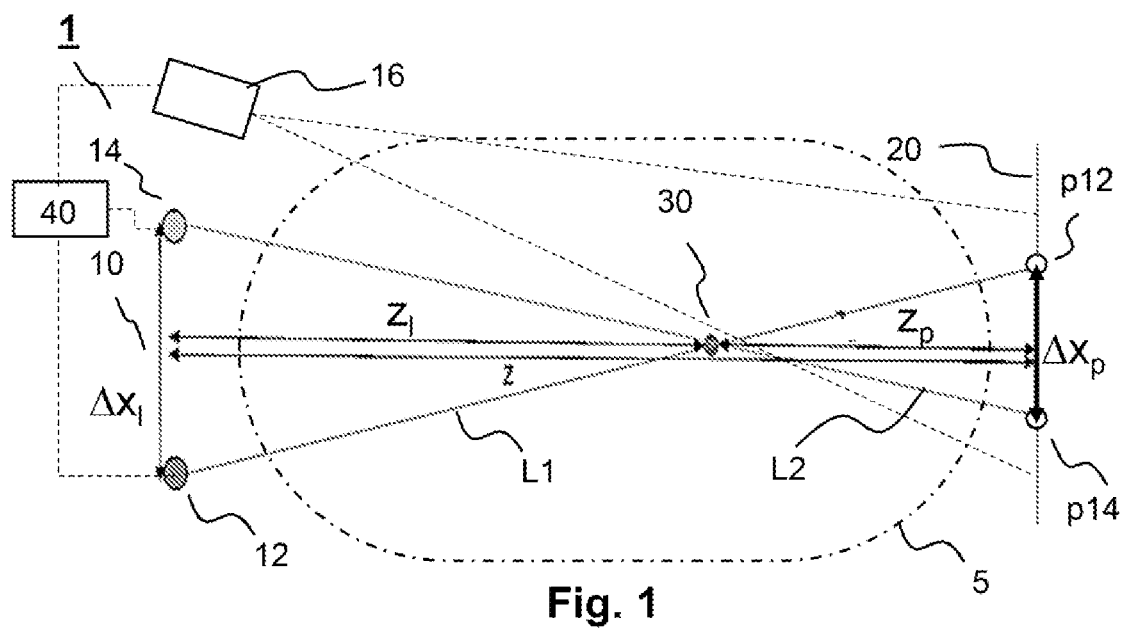
FIG. 1 shows a schematic diagram of an exemplary embodiment of a measuring device according to the present disclosure.

The exemplary embodiment shown in FIG. 1 of a stereoscopic measuring device 1 according to the present disclosure for determining a position of an event 30 in an interstitial space 5 comprises a lighting assembly 10 and a background structure which has a background surface 20 facing the lighting assembly 10. The background surface can be, for example, a wall of a building. Furthermore, the measuring device 1 comprises an imaging apparatus 16, such as an infrared camera; and an evaluation apparatus 40, which comprises, for example, a computer with software for image processing and for controlling the lighting assembly 10. The interstitial space 5 is arranged between the background surface 20 and the lighting assembly 10. The lighting assembly 10 is configured to illuminate the background surface 20 across the interstitial space 5 from at least two different lighting positions 12, 14. The lighting assembly 10 can comprise one or more interband cascade lasers in order to selectively excite specific absorption wavelengths of a gas to be monitored, or not do so, so that it is possible to establish not only measurement illuminations in which the gas is visible but also reference illuminations in which the gas has no effects. An interband cascade laser, such as in the IR range, can either be provided at each lighting position 12, 14, or the light from such a laser can be guided to the lighting position by means of deflection mirrors in order to illuminate the interstitial space 5 from there in the direction of the background surface 20. If other events are to be expected, such as hot gas, which leads to streaks forming due to fluctuating refractive indices, a different light source can also be used.

First light beams L1 originating from a first lighting position 12 should, together with second light beams L2 originating from the second lighting position 14, form an angle of not less than 1°, for example, not less than 2°, such that a first projection location p12 of the event location 30 on the background surface generated by the illumination of the background surface 20 from the first lighting position has a projection location distance $\Delta$xp from a second projection location p14 of the event location 30 generated by the illumination of the background surface from the second lighting position 14.

The evaluation apparatus 40 is configured to detect an event, to determine a projection location distance $\Delta$xp, and, on the basis of the projection location distance, to determine the position information Zp of the event location 30, wherein the event location 30 is a location at which an event occurs, i.e. a gas exits. For detecting the event, for example, recordings during illumination from two lighting positions 12, 14 in each case with two different wavelengths are to be compared with one another, one of which is absorbed by the gas and the other is not, or recordings at a wavelength are to be compared with previous recordings, for example in the form of long-term averagings, in order to detect changes. After detection of an event, the distance Zp of the event location 30 from the background surface 20 is to be determined on the basis of the associated projection locations p12, p14, in accordance with $Zp=Z\cdot\Delta xp/(\Delta xp+\Delta xl)$, wherein Z is the distance of the lighting assembly 10 from the background surface 20, $\Delta$xl is the distance of the lighting positions from one another, and $\Delta$xp is the projection location distance already discussed above. With knowledge of the distance Zp of the event location 30 from the background surface and the projection locations p12, 14, the event location 30 can then be determined precisely.

Figure 2A:
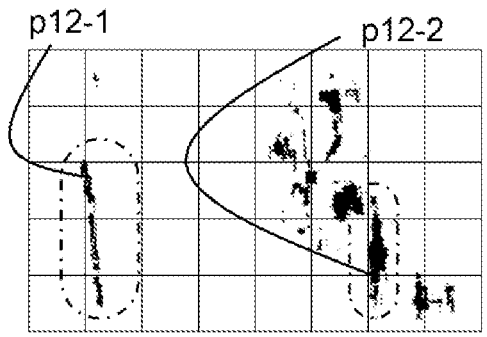
FIG. 2a shows an exemplary imaging of a projection from a first lighting position of a hot gas event onto a background surface.
Figure 2B:
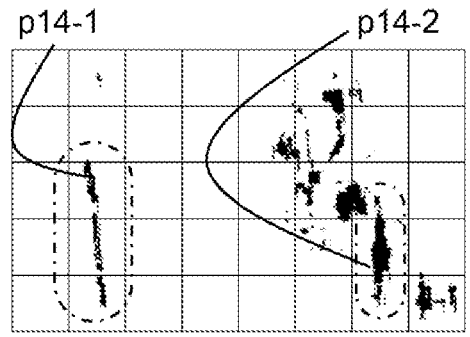
FIG. 2b shows an exemplary imaging of a projection from a second lighting position of a hot gas event onto a background surface.

FIGS. 2a and 2b show, by way of example, two recordings of a background surface 20 with projections of a hot gas event, that is to say the appearance of hot gas above a fire source, with illumination from different lighting positions. By means of digital image processing, image elements are initially assigned to the same event in the two recordings, and then the projection distance $\Delta$xp for the projection locations of events associated with one another is then to be determined, for example $\Delta$xp-1=p12-1-p14-1 and $\Delta$xp-2=p12-2-p14-2. Based on these data, the location information of the hot gas event can then be determined, as was explained above.

Figure 3:
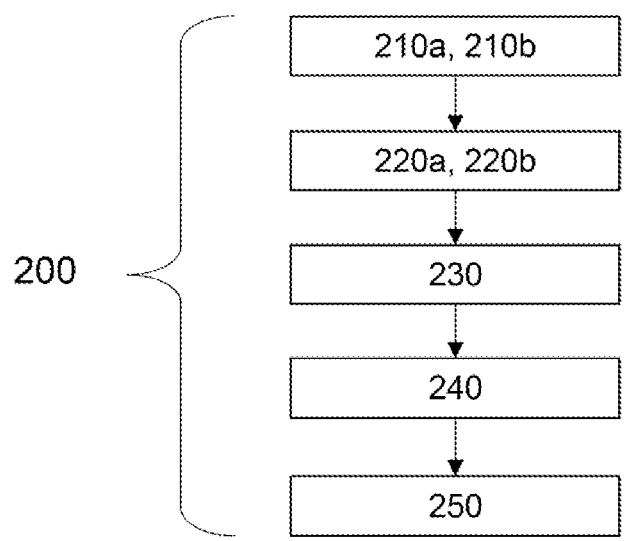
FIG. 3 shows a flowchart for an exemplary embodiment of the method according to the present disclosure.

The sequence of an exemplary embodiment of a method according to the present disclosure will now be described in summary with reference to FIG. 3.

The method 200 comprises the illumination 210a of a background surface across an interstitial space from a first lighting position as well as the spatially resolved imaging 210b of the background surface during illumination of the background surface from the first lighting position; illumination 210b of the background surface across the interstitial space from a second lighting position; and spatially resolved imaging of the background surface during illumination of the background surface from the second lighting position 220b.

As discussed above, the type of lighting leads to different projection locations of an event on the background surface.

The method further comprises detecting an event 230 by comparing recordings of the background under the influence of the event with reference recordings uninfluenced by the event. As soon as an event is detected, the determination of the projection location distance 240 follows on the basis of the projection locations of the event in the imagings of the background, and thus ultimately the determination of the position information of the event 250.

The invention claimed is:

1. A stereoscopic measuring device for determining position information of at least one event location in an interstitial space; comprising
    a lighting assembly;
    a background structure which has a background surface facing the lighting assembly;
    an imaging apparatus; and
    an evaluation apparatus;
    wherein the interstitial space is disposed between the background surface and the lighting assembly;
    wherein the lighting assembly is configured to illuminate the background surface across the interstitial space from a first lighting position and from at least one second lighting position, wherein the first lighting position has a defined lighting distance from the second lighting position,
    wherein first light beams originating from the first lighting position and passing through an event location in the interstitial space, together with second light beams passing through the event location in the interstitial space and originating from the second lighting position, form an angle of not less than 1° such that a first projection location of the event location on the background surface generated by illumination of the background surface from the first lighting position has a projection location distance from a second projection location of the event location generated by illumination of the background surface from the second lighting position,
    wherein the imaging apparatus is configured to image the first projection location and the second projection location in a spatially resolved manner,
    wherein the evaluation apparatus is configured to detect an event, to determine the projection location distance, and to determine the position information of the event location on the basis of the projection location distance,
    wherein the event location is a location at which an event occurs which comprises appearance of a medium to be detected, wherein, in a presence of the medium to be detected, an interaction of the medium to be detected with the first and second light beams changes at least one property of the first projection location and a property of the second projection location compared to reference conditions in which the medium to be detected is absent or effective in a different way.

2. The measuring device according to claim 1, wherein the imaging and evaluation apparatus is configured to detect the presence of the medium to be detected on the basis of a changed property of the first projection location and changed property of the second projection location.

3. The measuring device according to claim 1, wherein the first and second light beams differ in at least one property selected from the list of the following properties: wavelength, modulation, lighting time, polarization, and pattern.

4. The measuring device according to claim 2, wherein the changed property of the first and/or second projection locations comprises intensity and/or intensity fluctuations.

5. The measuring device according to claim 1, wherein the evaluation apparatus is configured to determine the position information as a function of the projection location distance, the lighting assembly, and the background surface.

6. The measuring device according to claim 1, wherein the imaging apparatus comprises a camera which is sensitive in the spectral range of the first and second light beams.

7. The measuring device according to claim 1, wherein the lighting assembly comprises at least one tunable laser.

8. The measuring device according to claim 7, wherein the lighting assembly comprises at least one optical beam expander with at least one refractive and/or reflective element, so that the light of the first and second light beams of the laser illuminate a solid angle of not less than 0.024 sr, or wherein the lighting assembly has a scanner apparatus which is configured to illuminate with the light of the laser the background surface in scanning fashion from the first and second lighting positions.

9. The measuring device according to claim 1, wherein a distance from the background surface to the lighting assembly is not less than 0.5 m.

10. A method for the stereoscopic determination of position information of at least one event location in an interstitial space, comprising the steps:
   illuminating a background surface across an interstitial space from a first lighting position;
   imaging, in a spatially resolved manner, the background surface during lighting of the background surface from the first lighting position;
   illuminating the background surface across the interstitial space from a second lighting position;
   imaging, in a spatially resolved manner, the background surface during lighting of the background surface from the second lighting position;
   wherein first light beams originating from the first lighting position and passing through the event location in the interstitial space, together with second light beams passing through the event location in the interstitial space and originating from the second lighting position, form an angle of not less than 1°, such that a first projection location of the event location on the background surface generated by illumination of the background surface from the first lighting position has a projection location distance from a second projection location of the event location generated by illumination of the background surface from the second lighting position, and
   detecting an event,
   determining the projection location distance, and
   determining the position information of the event location on the basis of the projection location distance,
   wherein the event location is a location at which an event occurs which comprises the appearance of a medium to be detected, wherein, in a presence of the medium to be detected, an interaction of the medium to be detected with the first and second light beams changes at least one property of the first projection location and a property of the second projection location in relation to reference conditions in which the medium to be detected is absent or effective in a different way.

11. The method according to claim 10, wherein the detecting of an event comprises a comparison of imagings of the background surface at different illuminations, wherein an event is detected when projection locations are to be detected that have different brightnesses in comparison with imagings.

12. The method according to claim 11, wherein the illumination from the first lighting position comprises a first measurement illumination with a measurement wavelength and a first reference illumination with a reference wavelength, wherein the illumination from the second lighting position comprises a second measurement illumination with the measurement wavelength and a second reference illumination with the reference wavelength, wherein the medium has different absorption coefficients at the measurement wavelength and the reference wavelength,
   wherein the background surface is imaged in each case for the illuminations from the first and second lighting positions with the measurement wavelength and the reference wavelength,
   wherein the comparison is performed between an imaging during the illumination with the reference wavelength and with the reference wavelength.

13. The method according to claim 11, wherein reference conditions are conditions in which the medium has not yet appeared, wherein an illumination from a lighting position is carried out with a measurement wavelength at which the medium has a greater absorption coefficient than an atmosphere under reference conditions, wherein the comparison is performed between recordings created at different times from the same lighting position.

* * * * *